US011299974B2

(12) United States Patent
Marshall (10) Patent No.: US 11,299,974 B2
(45) Date of Patent: *Apr. 12, 2022

(54) DOWN-HOLE GAS SEPARATION SYSTEM

(71) Applicant: Modicum, LLC, Midland, TX (US)

(72) Inventor: Gary V. Marshall, Gardendale, TX (US)

(73) Assignee: MODICUM, LLC, Gardendale, TX (US)

(*) Notice: Subject to any disclaimer, the term of this patent is extended or adjusted under 35 U.S.C. 154(b) by 100 days.

This patent is subject to a terminal disclaimer.

(21) Appl. No.: 16/736,374

(22) Filed: Jan. 7, 2020

(65) Prior Publication Data

US 2020/0141224 A1    May 7, 2020

Related U.S. Application Data

(63) Continuation of application No. 15/645,786, filed on Jul. 10, 2017, now Pat. No. 10,570,720.
(Continued)

(51) Int. Cl.
*B01D 19/00* (2006.01)
*E21B 43/38* (2006.01)
(Continued)

(52) U.S. Cl.
CPC .......... *E21B 43/38* (2013.01); *B01D 19/0094* (2013.01); *B01D 21/0087* (2013.01);
(Continued)

(58) Field of Classification Search
CPC ............ B01D 19/0094; B01D 21/0087; B01D 21/2488; B01D 21/2494; B01D 21/265; B04C 3/06; B04C 9/00; E21B 43/38
(Continued)

(56) References Cited

U.S. PATENT DOCUMENTS 1,407,873 A    2/1922  Liedbeck
1,973,650 A    9/1934  O'brien
(Continued)

FOREIGN PATENT DOCUMENTS

WO    WO 2018/013441 A1    1/2018

OTHER PUBLICATIONS

McCoy, J.N. et al, "An improved downhole gas separator," Petroleum Society of Canada Annual Technical Meeting, Jun. 14-18, 1999, Paper No. PETSOC-99-66 (Abstract). https://www.onepetro.org/conference-paper/PETSOC-99-66, retrieved Nov. 24, 2014.
(Continued)

*Primary Examiner* — Frank M Lawrence, Jr.
(74) *Attorney, Agent, or Firm* — Charles Knobloch (57) ABSTRACT

An apparatus for gas and solids separation from down-hole fluids having an inner tube and an outer tube disposed about the inner tube. The annular region between the tubes contain a plurality of chambers, separated by fluid barriers. The chambers include an intake chamber to receive fluids from outside of the outer tube through an orifice, and processing chambers. Fluid communication between the intake and processing chambers is restricted to fluid flow through sets of tubes. Fluid communication between a lowermost processing chamber below the intake chamber and a lower processing chamber above the intake chamber is restricted to fluid flow through the inner tube. A block restricts fluid communication within the inner tube to other chambers above the intake chamber. Orifices in the inner tube of the processing chambers on either side of the block provide fluid communication across the block.

2 Claims, 11 Drawing Sheets

Related U.S. Application Data (60) Provisional application No. 62/360,379, filed on Jul. 9, 2016, provisional application No. 62/360,382, filed on Jul. 9, 2016.

(51) Int. Cl.

| | | |
|---|---|---|
| *B01D 21/00* | (2006.01) | |
| *B01D 21/24* | (2006.01) | |
| *B01D 21/26* | (2006.01) | |
| *B04C 3/06* | (2006.01) | |
| *B04C 9/00* | (2006.01) | |

(52) U.S. Cl.
CPC ..... *B01D 21/2488* (2013.01); *B01D 21/2494* (2013.01); *B01D 21/265* (2013.01); *B04C 3/06* (2013.01); *B04C 9/00* (2013.01)

(58) Field of Classification Search
USPC ............ 96/204, 155, 220; 95/243, 260, 263; 166/105.5
See application file for complete search history.

(56) References Cited

U.S. PATENT DOCUMENTS

| | | | |
|---|---|---|---|
| 2,429,043 A | 10/1947 | Barnhart | |
| 2,614,649 A * | 10/1952 | Walker | E21B 43/34 95/252 |
| 2,652,130 A * | 9/1953 | Cedrick | E21B 43/38 166/54 |
| 3,128,719 A | 4/1964 | Jongbloed et al. | |
| 3,283,570 A | 11/1966 | Hodges | |
| 4,241,787 A | 12/1980 | Price | |
| 4,241,788 A | 12/1980 | Brennan | |
| 4,366,861 A | 1/1983 | Milam | |
| 4,515,608 A | 5/1985 | Clegg | |
| 4,531,584 A | 7/1985 | Ward | |
| 4,676,308 A | 6/1987 | Chow et al. | |
| 5,220,962 A | 6/1993 | Muller et al. | |
| 5,333,684 A * | 8/1994 | Walter | E21B 43/121 166/105.5 |
| 5,389,128 A | 2/1995 | Lopes | |
| 5,431,228 A | 7/1995 | Weingarten et al. | |
| 5,482,117 A * | 1/1996 | Kolpak | E21B 43/121 166/105.5 |
| 6,155,345 A | 12/2000 | Lee | |
| 6,179,054 B1 | 1/2001 | Stewart | |
| 6,228,146 B1 | 5/2001 | Kuespert | |
| 7,270,178 B2 | 9/2007 | Selph | |
| 7,377,314 B2 | 5/2008 | Gonzalez | |
| 7,635,030 B2 | 12/2009 | Knight et al. | |
| 7,823,635 B2 | 11/2010 | Wright et al. | |
| 9,518,458 B2 | 12/2016 | Ellithorp et al. | |
| 9,909,400 B2 | 3/2018 | Ellithorp et al. | |
| 10,385,672 B2 | 8/2019 | Zahran | |
| 10,436,008 B2 | 10/2019 | Marshall | |
| 10,570,720 B2 * | 2/2020 | Marshall | B01D 21/265 |
| 2005/0081718 A1 | 4/2005 | Carruth | |
| 2007/0114020 A1 | 5/2007 | Brekke | |
| 2009/0266755 A1 | 10/2009 | Fenton | |
| 2013/0032341 A1 | 2/2013 | Raglin | |
| 2014/0158343 A1 | 6/2014 | Cobb et al. | |
| 2018/0023379 A1 | 1/2018 | Marshall | |
| 2018/0187531 A1 | 7/2018 | Ellithorp et al. | |
| 2018/0280834 A1 * | 10/2018 | Marshall | E21B 43/38 |
| 2019/0055809 A1 | 2/2019 | Ellithorp | |
| 2019/0085677 A1 | 3/2019 | Marshall | |
| 2019/0085678 A1 | 3/2019 | Marshall | |
| 2020/0141224 A1 | 5/2020 | Marshall | |
| 2020/0291762 A1 | 9/2020 | Ellithorp | |
| 2020/0308943 A1 | 10/2020 | Ellithorp | |
| 2021/0108498 A1 | 4/2021 | Marshall | |

OTHER PUBLICATIONS

Lackner, G., et al, "Effect of Viscosity on Downhole Gas Separation in a Rotary Gas Separator," SPE Production & Facilities (2002) 17(3):184-191, (Summary), https://www.onepetro.org/journal-paper/SPE-79076-PA, Summary retrieved Nov. 24, 2014.

McCoy, James N. et al, "A Laboratory Study With Field Data of Downhole Gas Separators," SPE Production & Operations (2007) 22(1), (Summary). https://www.onepetro.org/journal-paper/SPE-96619-PA, retrieved Nov. 24, 2014.

Bohorquez, R.R., et al, "Laboratory Testing of Downhole Gas Separators," SPE Annual Technical Conference and Exhibition, Nov. 11-14, 2007, SPE-109532, (Abstract). https://www.onepetro.org/conference-paper/SPE-109532-MS, retrieved Nov. 24, 2014.

Weingarten, J.S., et al, "Development and Testing of a Compact Liquid-Gas Auger Partial Separator for Downhole or Surface Applications," SPE Production & Facilities (1997) 12(1):34-40, (Summary). https://www.onepetro.org/journal-paper/SPE-30637-PA, retrieved Nov. 24, 2014.

Konylinski, L.S., et al, "Development and Field Test Results of an Efficient Downhole Centrifugal Gas Separator," Journal of Petroleum Technology (1985) 37(7):1295-1304, (Summary). https://www.onepetro.org/journal-paper/SPE-11743-PA, retrieved Nov. 24, 2014.

Schmoe, W. P., "Bottom-hole Gas Separators Increase Production," API Drilling and Production Practice (Jan. 1958), API-58-042, (Abstract). https://www.onepetro.org/conference-paper/API-58-042, retrieved Nov. 24, 2014.

Clegg, J.D., "Understanding and Combating Gas Interference in pumping wells," Drilling and Production Practice (Jan. 1963), API-63-149, (Abstract). https://www.onepetro.org/conference-paper/API-63-149, retrieved Nov. 24, 2014.

Podio, A.L., et al, "Evaluation and Performance of Packer-Type Downhole Gas Separators," SPE Production and Operations Mar. 23-26, 2013, SPE-164510, (Abstract). https://www.onepetro.org/conference-paper/SPE-164510-MS.

Podio, A.L., et al, "Decentralized Continuous-flow Gas Anchor," Journal of Canadian Petroleum Technology (1996) 35(7), (Abstract). https://www.onepetro.org/journal-paper/PETSOC-96-07-03, retrieved Nov. 24, 2014.

Evolution Oil Tools Inc, "Beam Pump Gas Separator", http://eotools.eom/pdfs/6/Beam%20Gas%20Separator_Rev.E0_22-Sep-11.pdf, retrieved Oct. 24, 2018.

Evolution Oil Tools Inc, "Beam Gas Separator", https://eotools.com/images/pdfs/222-10-case_history_rev-a%20beam%20gas%20separator.pdf, retrieved Oct. 24, 2018.

PCT/IB/373, International Preliminary Report on Patentability, PCT/US2017/041283, International Filing Date Jul. 9, 2017.

PCT/ISA/210, International Search Report, PCT/US2017/041283, International Filing Date Jul. 9, 2017.

PCT/ISA/237, Written Opinion of the International Searching Authority, PCT/US2017/041283, International Filing Date Jul. 9, 2017.

* cited by examiner

DOWN-HOLE GAS SEPARATION SYSTEM

CROSS REFERENCE TO RELATED APPLICATIONS

This application claims priority to U.S. Ser. No. 15/645,786 of filing date 10 Jul. 2017, which claims priority to U.S. Provisional Application 62/360,379 of filing date 9 Jul. 2016 and to U.S. Provisional Application 62/360,382 of filing date 9 Jul. 2016. PCT/US17/41283 filed on 9 Jul. 2017 claims priority to U.S. Provisional Application 62/360,379 of filing date 9 Jul. 2016 and U.S. Provisional Application 62/360,382 of filing date 9 Jul. 2016.

BACKGROUND OF THE INVENTION

1. Field of the Invention

Disclosed herein are improvements to down-hole gas separation method, apparatus, and system.

2. Background Art

To provide further explanation of the art, reference is made to the disclosures of U.S. Provisional Application 62/101,937 of filing date 9 Jan. 2015, entitled "Down-Hole gas Separation System" and PCT Application PCT/US16/12419 of filing date 7 Jan. 2016.

BRIEF SUMMARY OF THE INVENTION

Disclosed is an apparatus for gas and solids separation from down-hole fluids. The apparatus includes: an inner tube having a length in a longitudinal direction; an outer tube disposed about the inner tube; and a plurality of chambers, wherein each chamber is defined by an annular region between the outer tube, the inner tube, and a first fluid barrier and a second fluid barrier, each fluid barrier disposed in an annular region between the inner tube and the outer tube. One of the plurality of chambers comprises an intake chamber, in fluid communication with the outside of the outer tube through an orifice. One of the plurality of chambers comprises a first processing chamber (ML) disposed longitudinally adjacent to the intake chamber. One of the plurality of chambers comprises a second processing chamber (H) disposed longitudinally adjacent to the first processing chamber, opposite from the intake chamber. One of the plurality of chambers comprises a third processing chamber (CL) disposed longitudinally adjacent to the second processing chamber (H), opposite from the first processing chamber (ML). One of the plurality of chambers comprises a fourth processing chamber (R1) disposed longitudinally adjacent to the intake chamber, opposite from the first processing chamber (ML). One of the plurality of chambers comprises a fifth processing chamber (R2) disposed longitudinally adjacent to the fourth processing chamber (R1), opposite from the intake chamber. Fluid communication between the intake chamber and the first processing chamber (ML) is restricted to fluid flow through a first set of a plurality of tubes. Fluid communication between the first processing chamber (ML) and the second processing chamber (H) is restricted to fluid flow through a second set of a plurality of tubes. Fluid communication between the second processing chamber (H) and the third processing chamber (CL) is restricted to fluid flow through a third set of a plurality of tubes. A block restricts fluid communication within the inner tube between the fourth processing chamber (R1) and the fifth processing chamber (R2). Fluid communication between the third processing chamber (CL) and the fourth processing chamber (R1) is restricted to fluid flow through the inner tube. An orifice in the inner tube is disposed in the fourth processing chamber (R1), proximate to the fifth processing chamber (R2) and on a first side of the block, providing fluid communication between fourth processing chamber (R1) and the inner tube. An orifice in the inner tube is disposed in the fifth processing chamber (R2), proximate to the fourth processing chamber (R1) and on the opposite side of the block, providing fluid communication between fifth processing chamber (R2) and the inner tube. Fluid communication between the fourth processing chamber (R1) and the fifth processing chamber (R2) is restricted to fluid flow through a fourth set of a plurality of tubes.

In one example, the tubes of the sets of tubes are made of polytetrafluoroethylene (PTFE).

BRIEF DESCRIPTION OF THE SEVERAL VIEWS OF THE DRAWING

FIG. 3 (D-102) illustrates detail of isolation structure between the chambers, providing orifices for tubes to pass there through.

DETAILED DESCRIPTION

Figure 1:
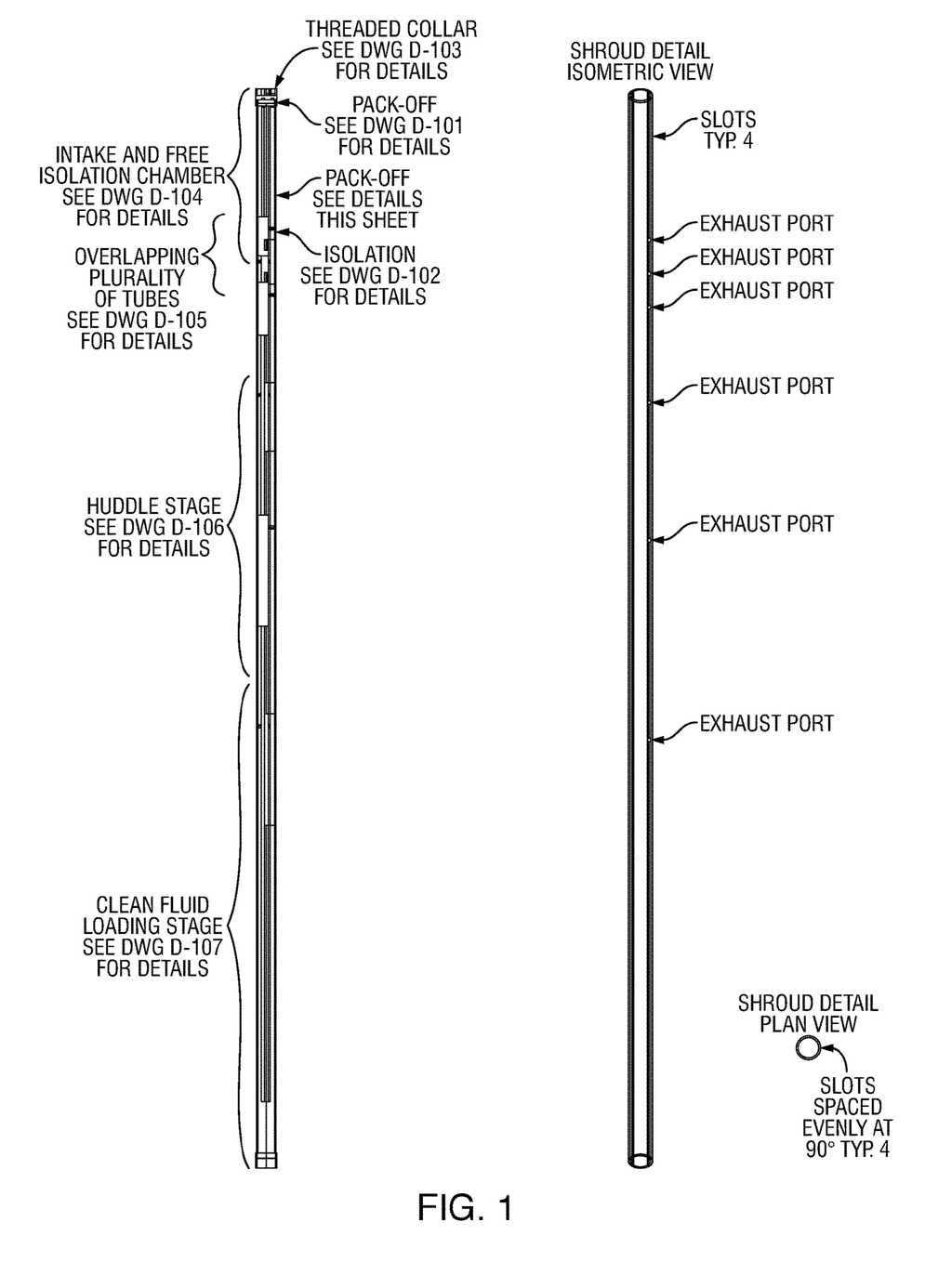
FIG. 1 (D-100) illustrates a configuration for gas separation that includes an intake chamber, chamber beneath the intake chamber having a plurality of overlapping tubes, chamber beneath the overlapping tube chamber also called a "huddle stage", and a loading stage chamber beneath the "huddle stage" chamber.
Figure 5:
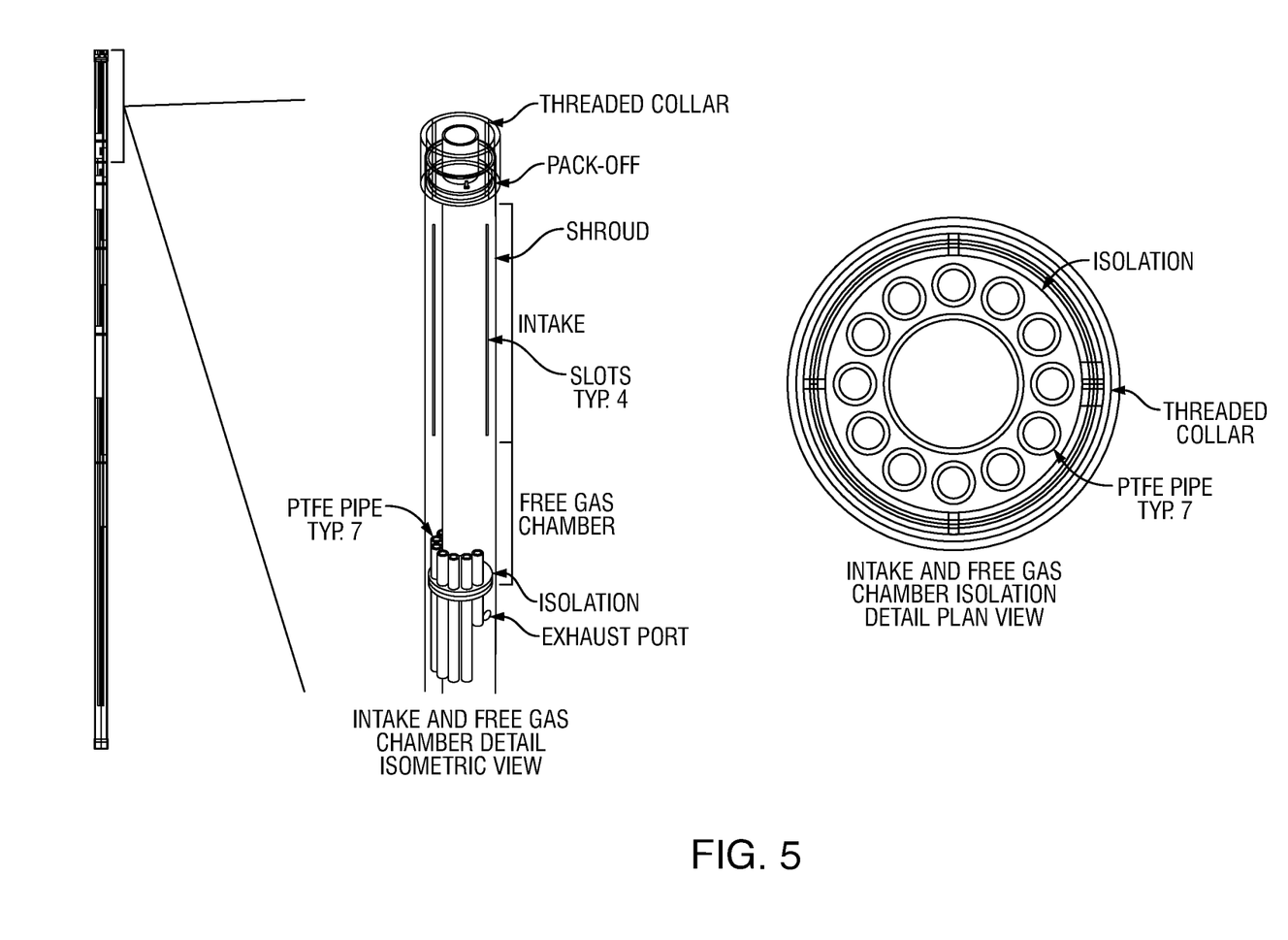
FIG. 5 (D-104) illustrates detail of the intake and free gas chamber with intake slots. Detail of the isolation structure at bottom of the intake and free gas chamber (and top of overlapping tube chamber) is also shown.
Figure 6:
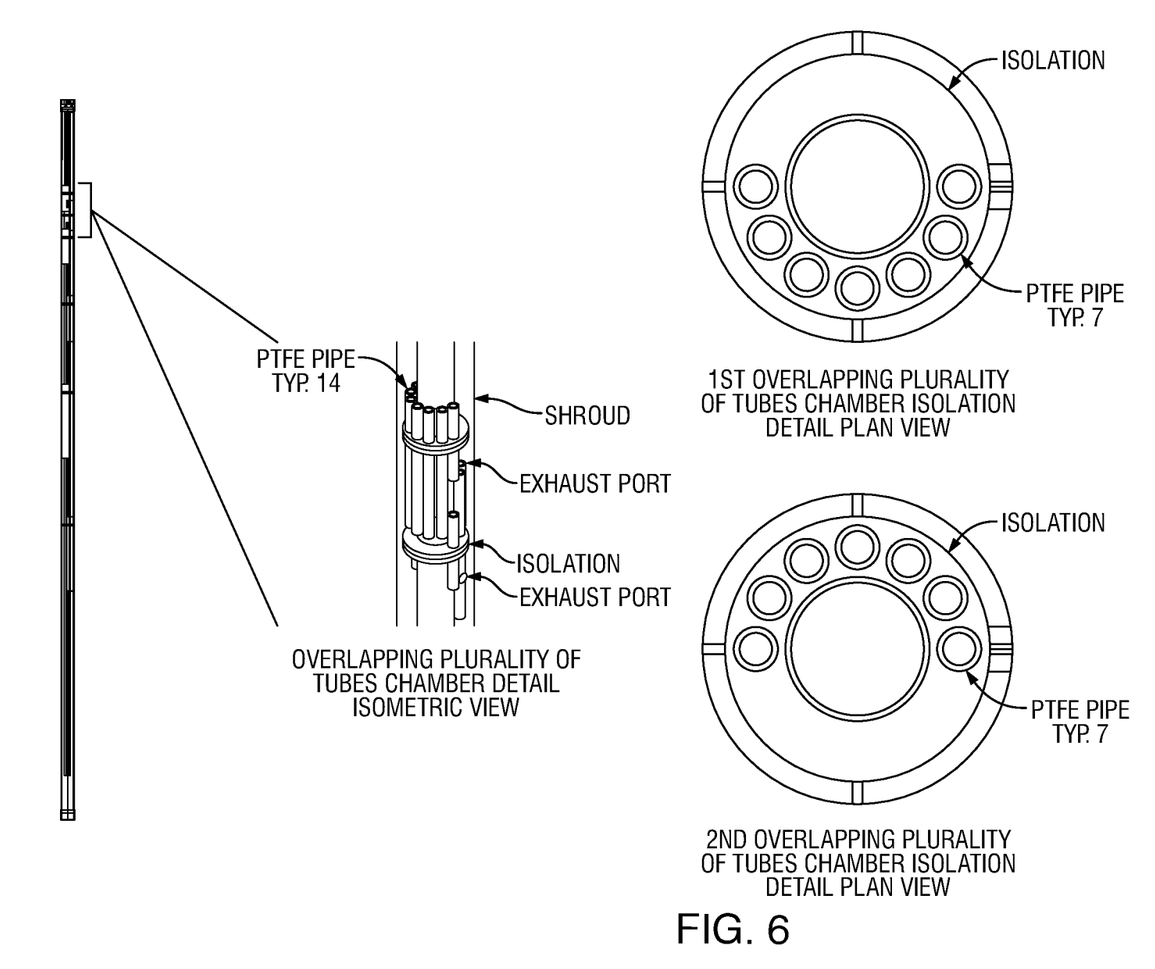
FIG. 6 (D-105) illustrates detail of the placement of the overlapping tubes in the "overlapping tube" chamber.
Figure 7:
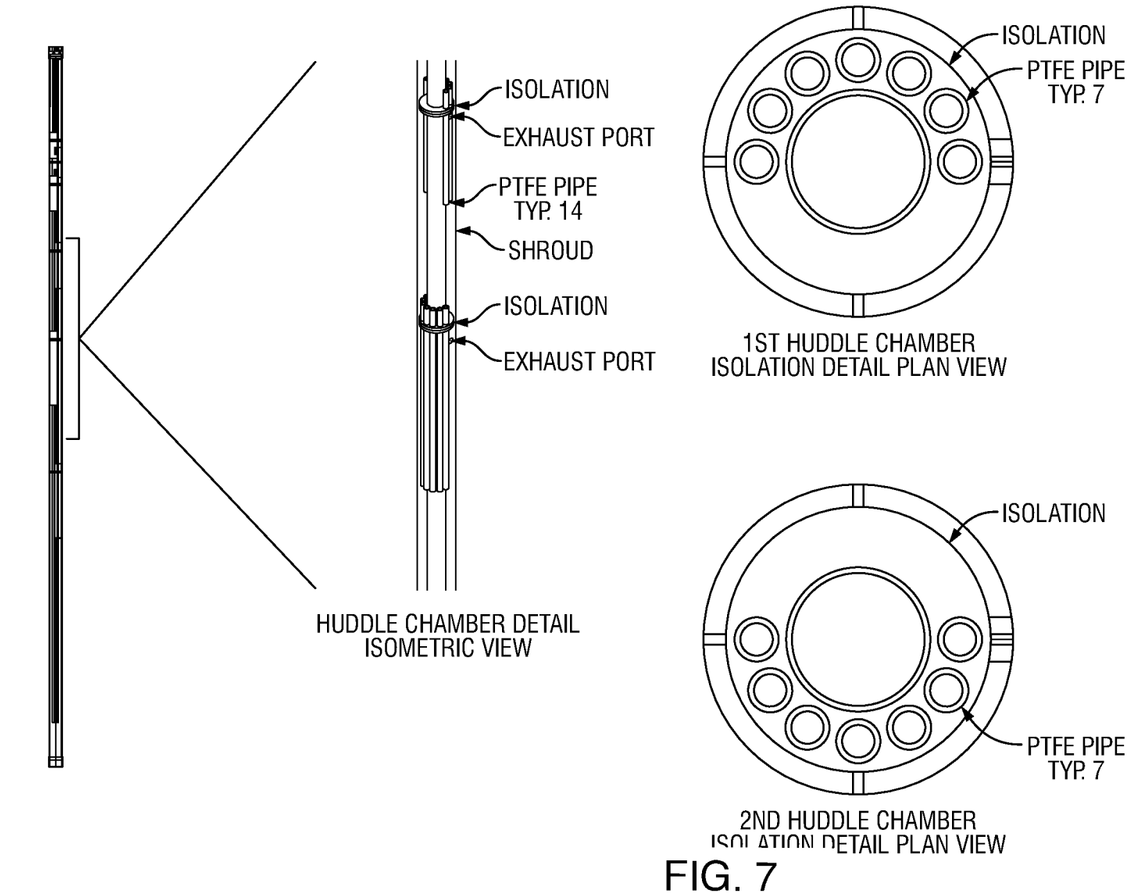
FIG. 7 (D-106) illustrates detail of the placement of the tubes in the "huddle" chamber.
Figure 8:
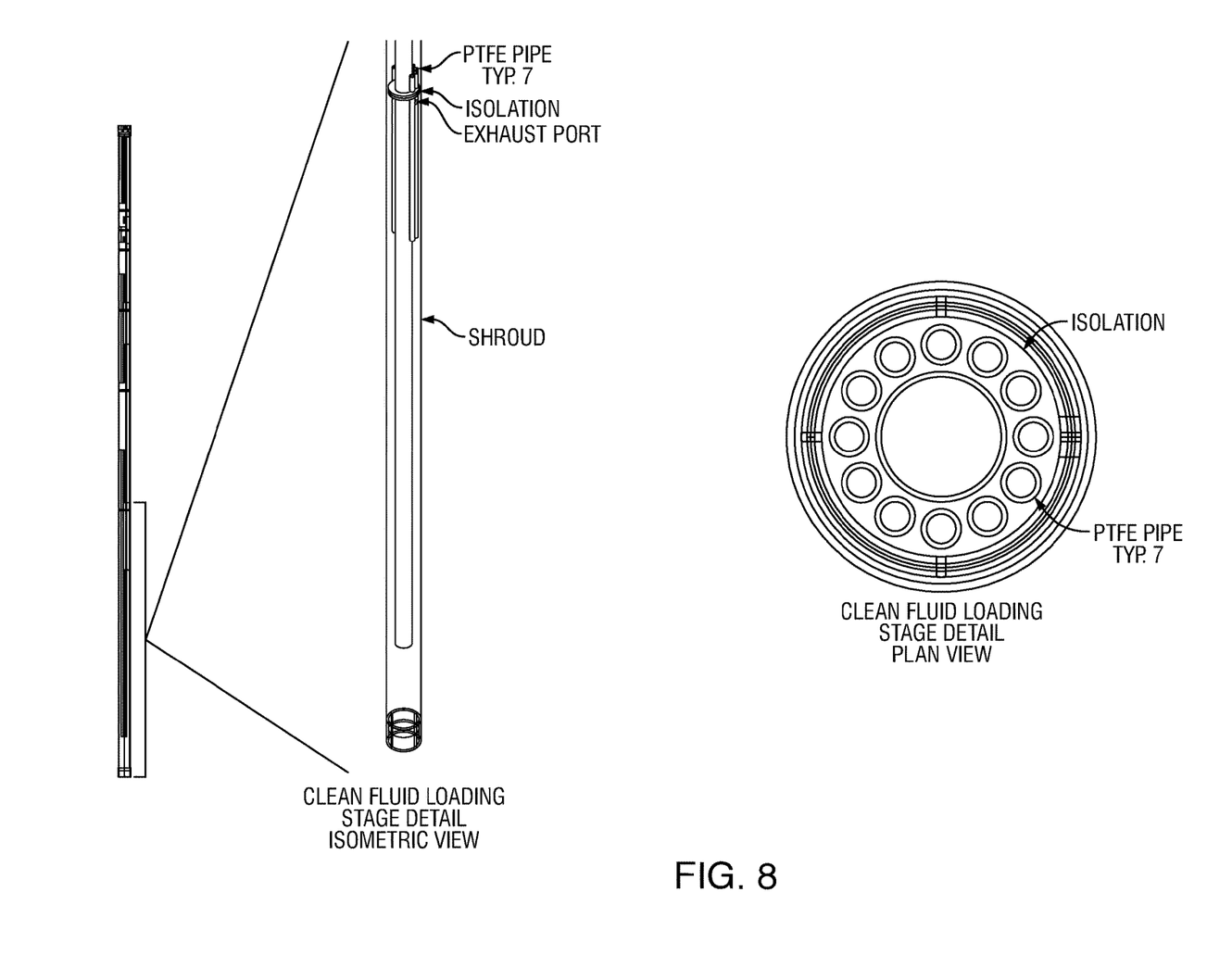
FIG. 8 (D-107) illustrates detail of the placement of tubes in the loading stage chamber. As shown, the bottom of the inner pipe is open in this chamber. The set of tubes from the chamber above terminate into this chamber. Detail of the isolation structure at the top of the chamber is shown. In one example, the bottom of the chamber is closed.

In one example, Fig. FIG. 1 (D-100) discloses a configuration for gas separation that includes an intake chamber (FIG. 5 (D-104) for detail view), chamber beneath the intake chamber having a plurality of overlapping tubes (FIG. 6 (D-105) for detail view), chamber beneath the overlapping tube chamber also called a "huddle stage" (FIG. 7 (D-106) for detail view), and a loading stage chamber (FIG. 8 (D-107) for detail view) beneath the "huddle stage" chamber. In one example, exhaust port(s) are placed in the shroud near the tops of one or more of these chambers. In the example shown, there are two overlapping tube chambers and two "huddle stage" chambers. In one example. the overlapping tubes are made of polytetrafluoroethylene (PTFE).

Figure 2:
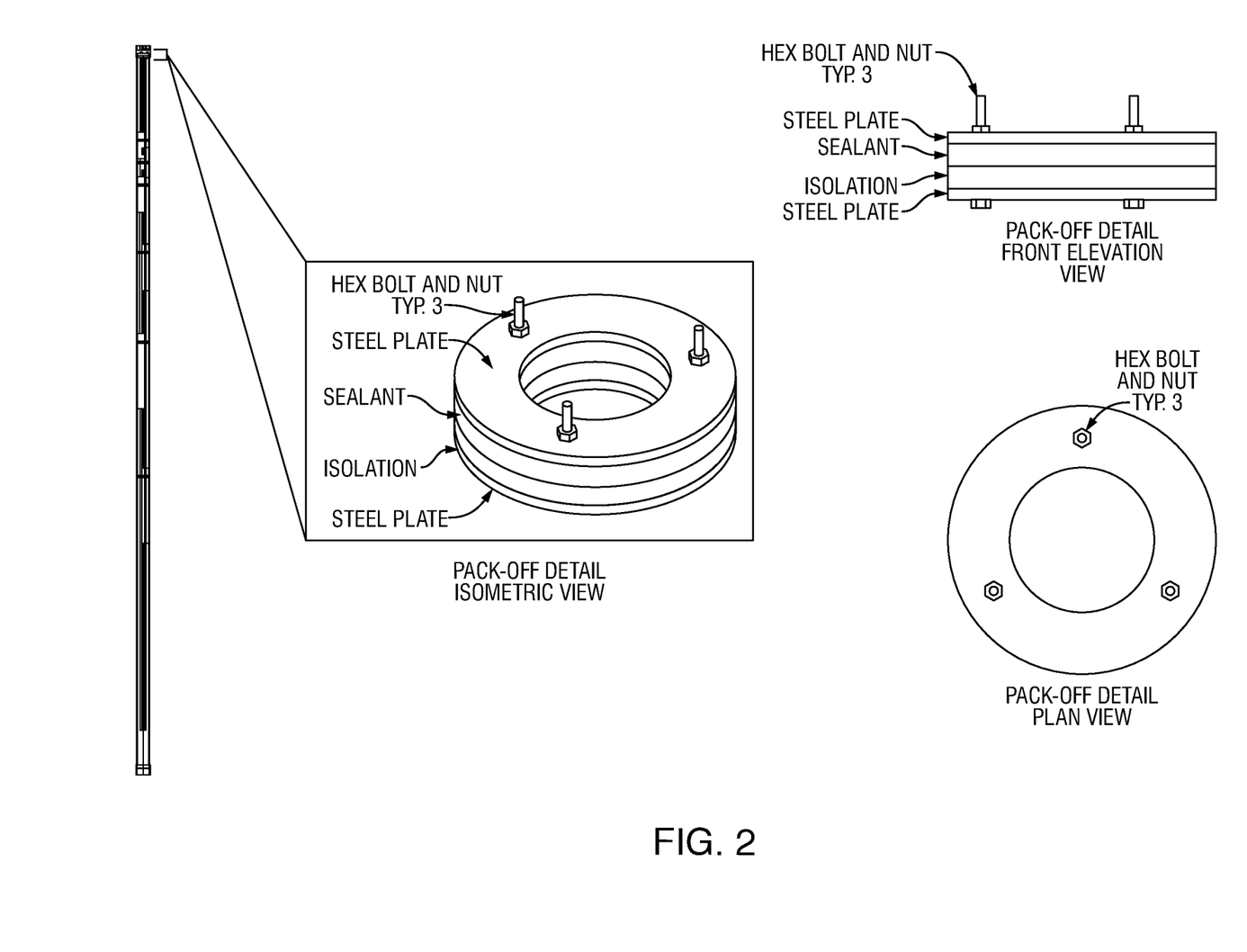
FIG. 2 (D-101) illustrates detail of pack-off, isolation detail, shown at the top of the apparatus.

In one example, FIG. 2 (D-101) discloses detail of pack-off, isolation detail, shown at the top of the apparatus.

Figure 3:
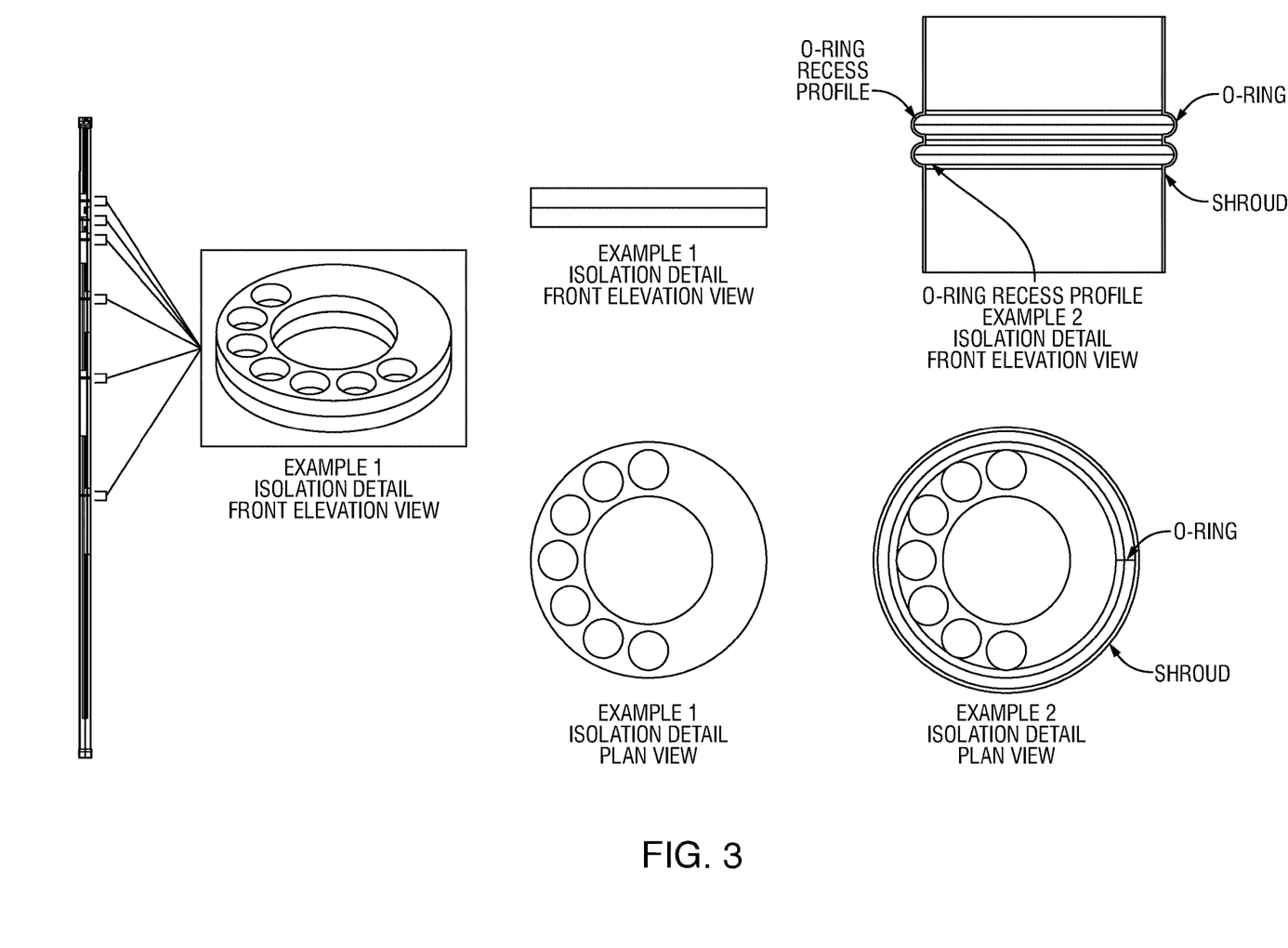

In one example, FIG. 3 (D-102) discloses detail of isolation structure between the chambers, providing orifices for tubes to pass there through.

Figure 4:
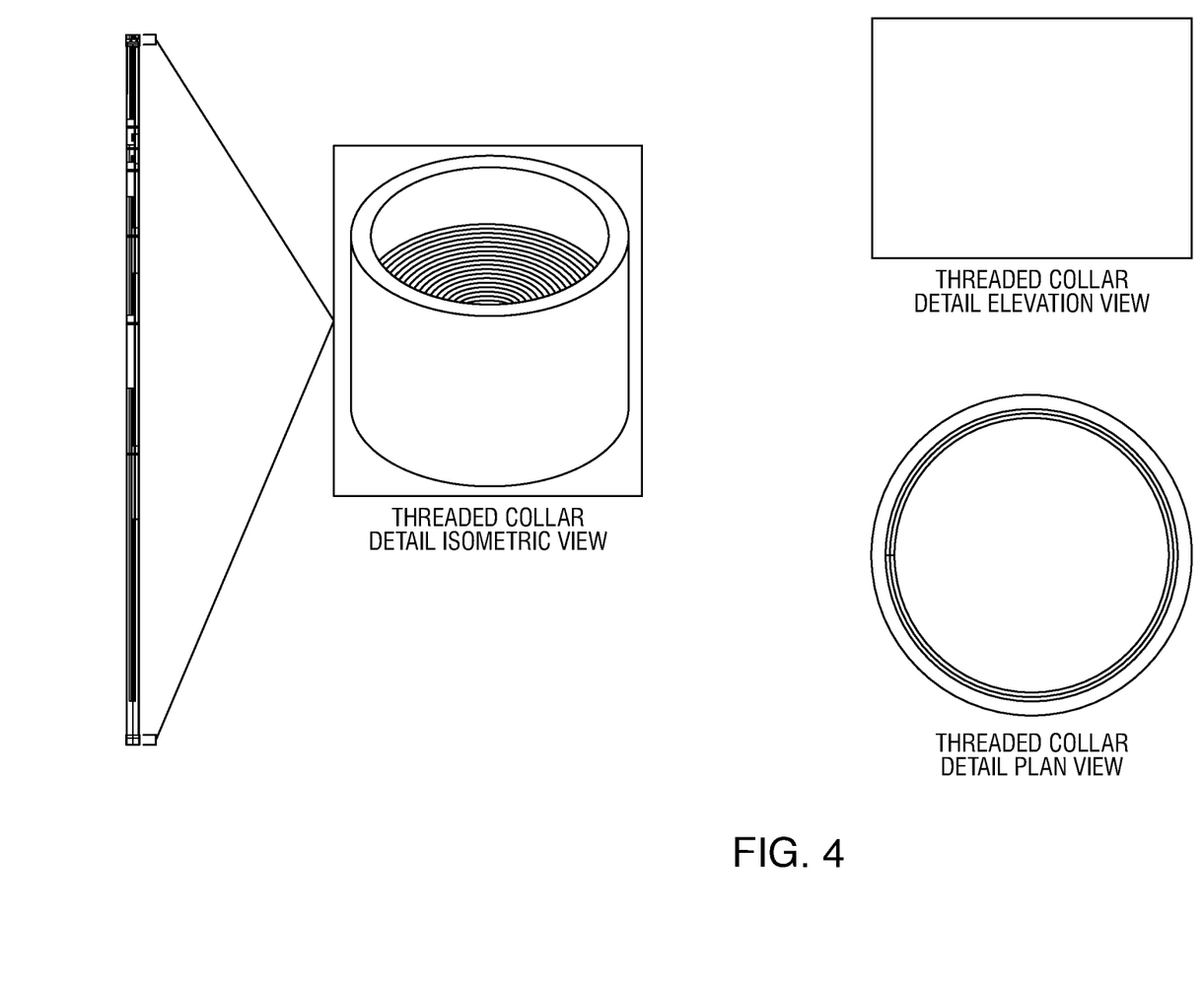
FIG. 4 (D-103) illustrates threaded collar detail for attachment of the apparatus to other pipe or tools.

In one example, FIG. 4 (D-103) discloses threaded collar detail for attachment of the apparatus to other pipe or tools.

In one example, FIG. 5 (D-104) discloses detail of the intake and free gas chamber with intake slots. Detail of the isolation structure at bottom of the intake and free gas chamber (and top of overlapping tube chamber) is also shown.

In one example, FIG. 6 (D-105) discloses detail of the placement of the overlapping tubes in the "overlapping tube" chamber. Detail of the top isolation structure and bottom isolation structure is also shown. In the example shown, the set of tubes entering from the top are disposed on one side of the chamber (approximately 0 to 180 degrees) and the set of tubes exiting the bottom are disposed on the other side of the chamber (approximately 180 to 360 degrees). As shown in this example, the tubes projecting from the top (from the chamber above) terminate into this overlapping tube chamber. Likewise, the tubes projecting from the bottom (from the chamber below) terminate into this overlapping chamber. The tubes from the top terminate at a position lower than the position where the tubes from the bottom terminate: hence, the term "overlapping tube".

In one example, FIG. 7 (D-106) discloses detail of the placement of the tubes in the "huddle" chamber. Detail of the top isolation structure and bottom isolation structure is also shown. In the example shown, the set of tubes entering from the top are disposed on one side of the chamber (approximately 0 to 180 degrees) and the set of tubes exiting the bottom are disposed on the other side of the chamber (approximately 180 to 360 degrees). As shown in this example, the tubes projecting from the top (from the chamber above) terminate into this "huddle" chamber. Likewise, the tubes projecting from the bottom (from the chamber below) terminate into this "huddle" chamber. The tubes from the top terminate at a position higher than the position where the tubes from the bottom terminate: in this example, they do not "overlap".

In one example, FIG. 8 (D-107) discloses detail of the placement of tubes in the loading stage chamber. As shown, the bottom of the inner pipe is open in this chamber. The set of tubes from the chamber above terminate into this chamber. Detail of the isolation structure at the top of the chamber is shown. In one example, the bottom of the chamber is closed.

Figure 9:
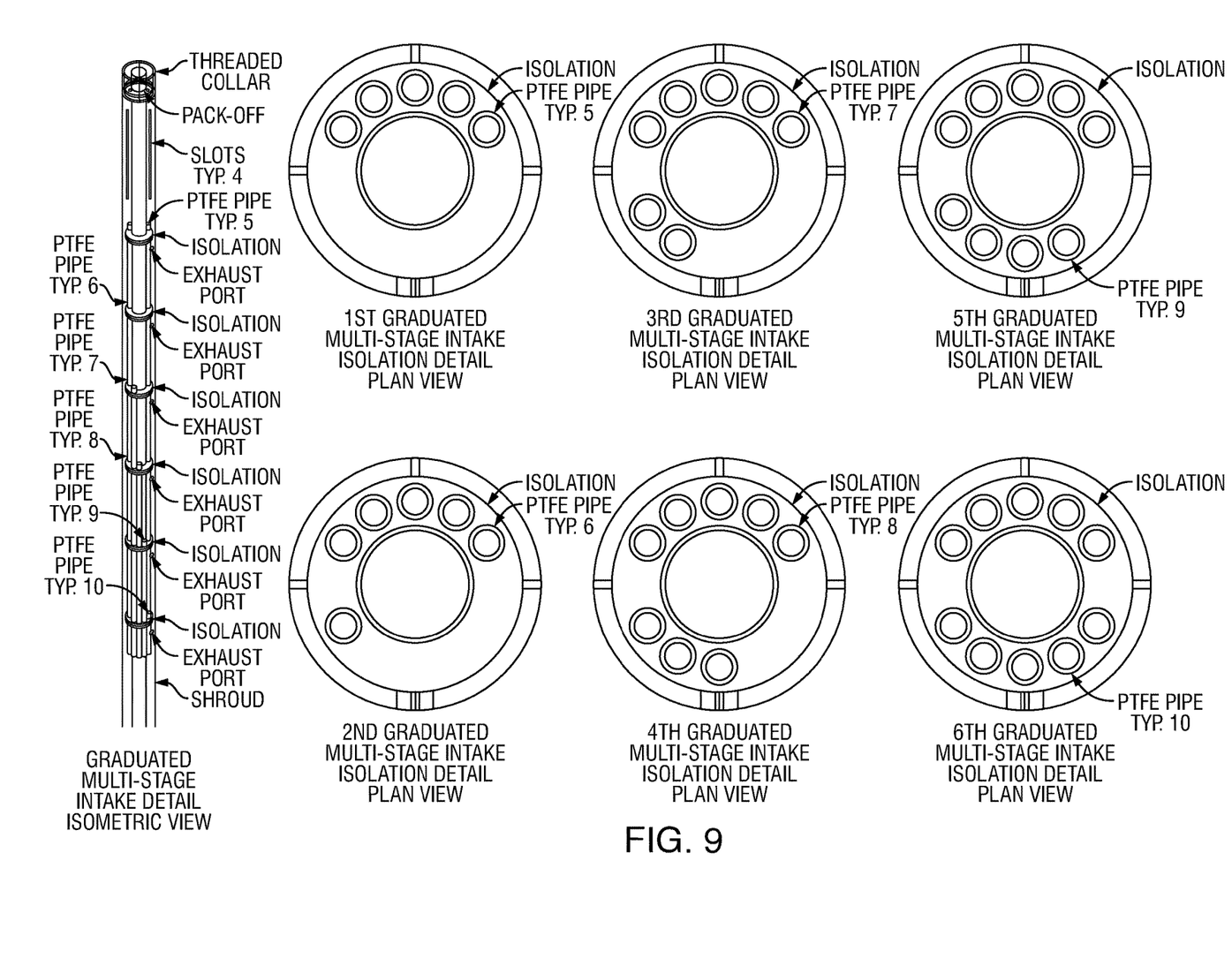
FIG. 9 (D-108) illustrates detail of a graduated multi-stage chamber system. Details of the isolations structures between the chambers is also shown, including relative placement of the openings for the sets of tubes. In one example, the lengths of the chambers are varied, or, for example, graduated.

In one example, FIG. 9 (D-108) discloses detail of a graduated multi-stage chamber system. Details of the isolations structures between the chambers is also shown, including relative placement of the openings for the sets of tubes. In one example, the lengths of the chambers are varied, or, for example, graduated.

Figure 10:
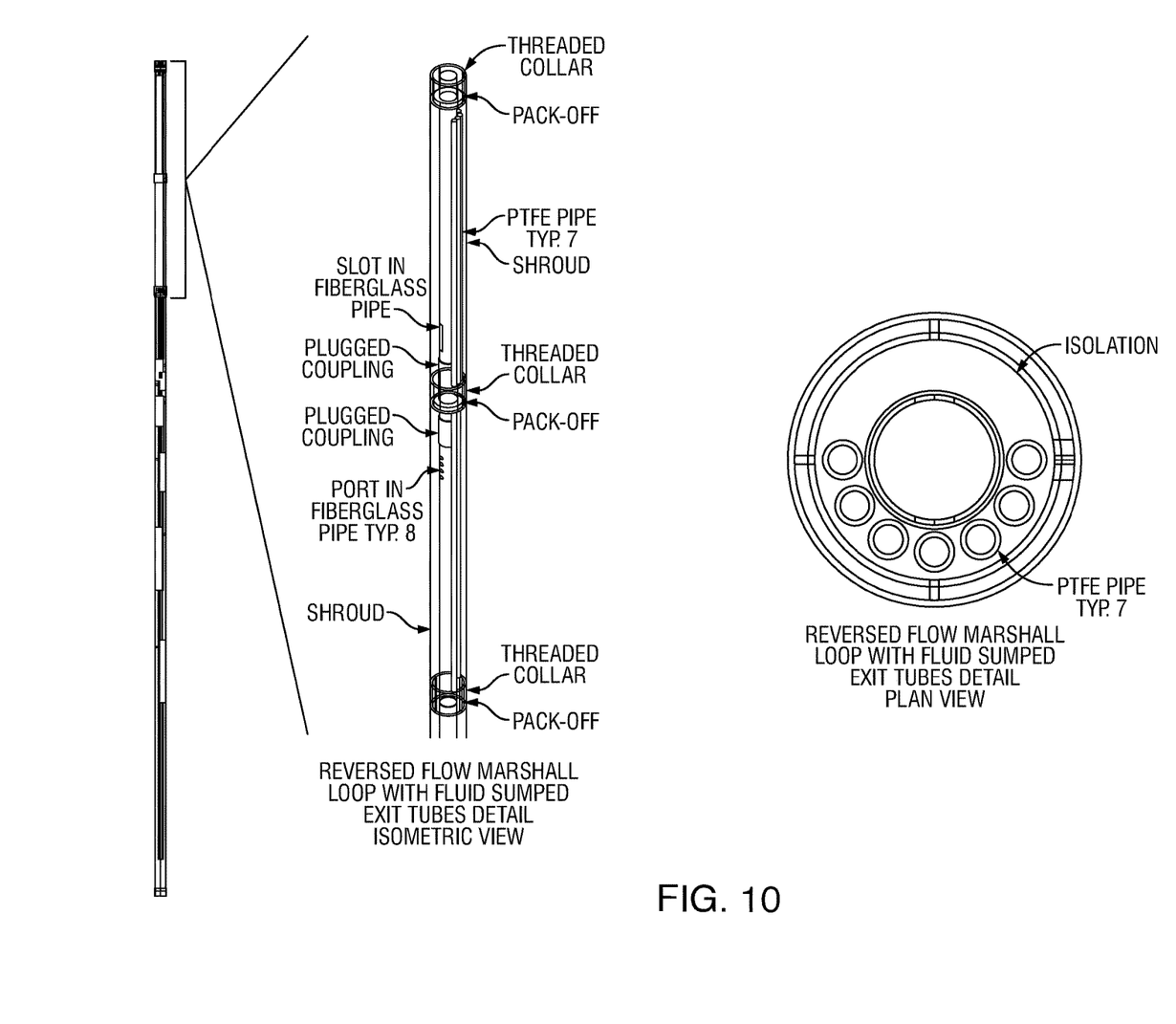
FIG. 10 (D-109) illustrates a reverse flow Marshall Loop.

In one example. FIG. 10 (D-109) discloses a reverse flow Marshall Loop. In the example as shown, two chambers are placed above the intake chamber ("reverse flow" chambers). The inner pipe is blocked by a plugged coupling in such a way that flow from the loading stage chamber exits the inner pipe and flows into the lower of "reverse flow" chambers. As shown, ports on the inner pipe, near the top of the lower chamber, enable the flow from the inner pipe (from the loading stage chamber) into the lower "reverse flow" chamber. A tube or set of tubes are placed in such as way as to allow flow from the lower "reverse flow" chamber into the upper "reverse flow" chamber. As shown, these tubes terminate near the bottom of the lower "reverse flow" chamber and near the top of the upper "reverse flow" chamber. The upper "reverse flow" chamber has slots into the inner pipe (above the plugged coupling) which enables the flow to exit the upper "reverse flow" chamber into the inner pipe, continuing upward to ultimately exit the well as produced fluids. As shown, the slots in the inner pipe in the upper "reverse flow" chamber are disposed near the bottom of the upper "reverse flow" chamber. In one example, the inner pipe is made of fiberglass. As shown, the isolation structure of the bottom of the lower "reverse flow" chamber is a pack-off (in one example, with a threaded collar), as there is no flow communication between the intake chamber and the lower "reverse flow" chamber in the annular region between the shroud and the inner pipe. Detail of the isolation structure between the upper "reverse flow" chamber and the lower "reverse flow" chamber is also shown.

Figure 11:
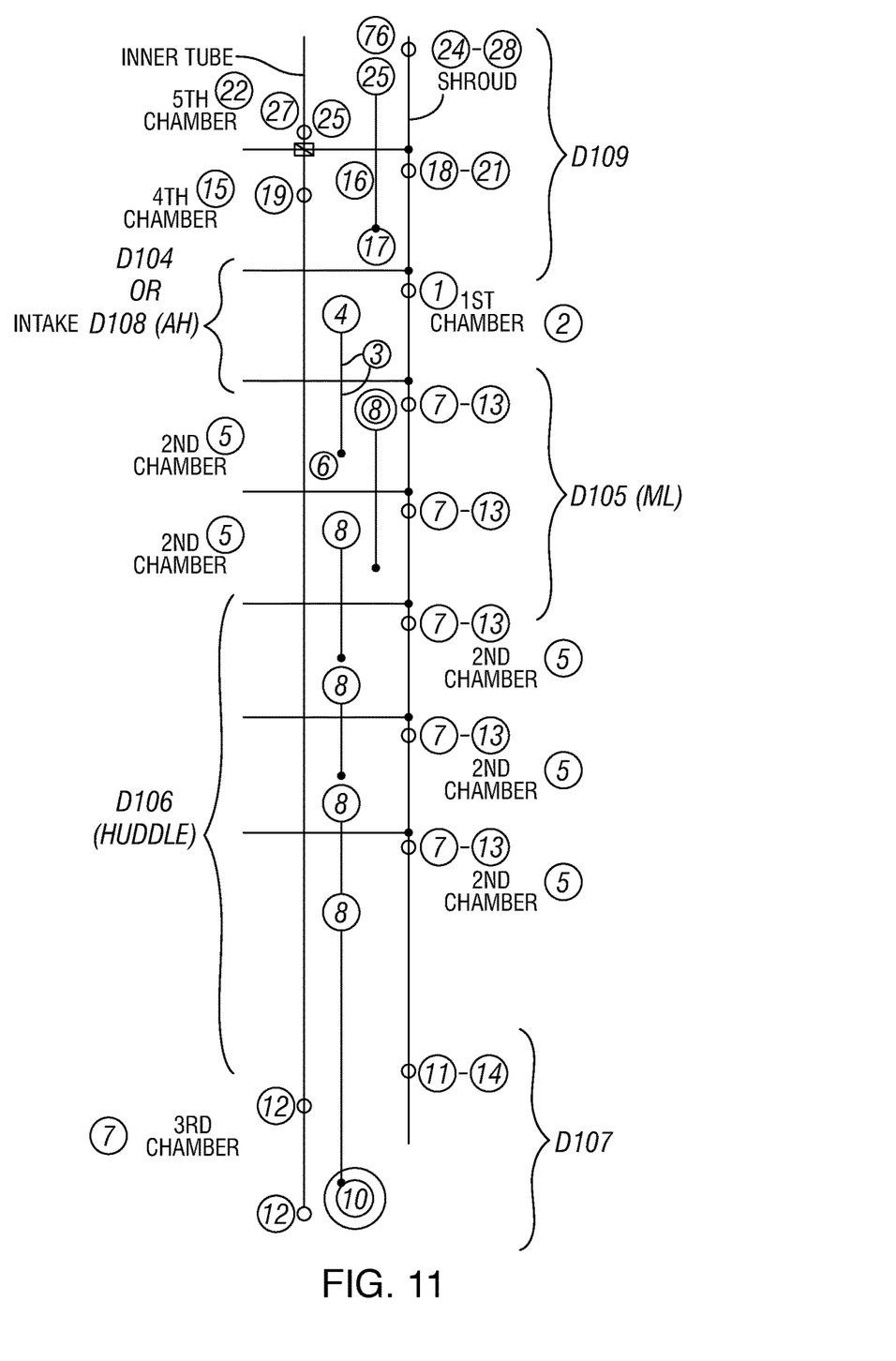
FIG. 11 (D-110) illustrates a schematic sketch, showing one example configuration with relative placement of the chambers and the relative placement of the sets of tubes communicating between the chambers.

A schematic sketch is also disclosed, FIG. 11 (D-110), showing one example configuration with relative placement of the chambers and the relative placement of the sets of tubes communicating between the chambers.

Additional detail and examples are as follows:

Intake Chamber (See FIG. 5 (D-104), 5/11 and FIG. 9 (D-108), 9/11).

In one example, Fluid and Gaseous and/or Solids-laden Fluid enters slotted intake of apparatus (FIG. 5 (D-104)).

In one example, an alternate intake chamber configuration is shown (FIG. 9 (D-108)), with slots along the shroud for intake of fluids.

In one example, one or more intake chambers or cascading intake chambers are utilized, Each chamber having an orifice communicating with the annulus of the well. One of more of the first ends of the plurality of tubes is positioned and arrange in the bottom of each respective intake chamber and the second open ends of such are arranged and positioned in Marshall Loop Chamber, so that each intake chamber does not communicate with any other intake chamber and that each intake chamber separately communicates with the Marshall Loop Chamber.

When a pressure drop occurs in the Marshall Loop Chamber, pressure drop is recognized by all intake chambers.

Additional Description of Cascading Intake.

In further example, one or more first chambers or series of chambers includes (Alternate a series of intervening chambers where the first open end or ends of the plurality of tubes of the respective intervening chamber is positioned in the respective intervening chamber and the second open ends of the plurality of tubes of the respective intervening chamber is positioned and arranged in the overlapping tube chamber.

Free Gas Chamber (See FIG. 5 (D-104), 5/11).

In one example. an area is provided between the Orifice in the Intake Chamber and the top of the Marshall Loop Chamber ("overlapping tube" chamber) wherein free/broken gas is allowed to express or escape through intake slots as Gaseous and solids-laden fluid travels through the annulus (area between the inside of the shroud of apparatus and outside of the dip tube) of Free Gas Chamber.

Marshall Loop Chamber (See FIG. 6 (D-105), 6/11).

In one example, a plurality of tubes by which gaseous and solids-laden fluids enter chamber; a second plurality of tubes, the entry point of which is above the exit point of the first plurality of tubes forcing the gaseous and solids-laden fluids to reverse direction of flow; free gas rises to the top of the chamber and is expelled from chamber through an orifice in the top of the chamber by way of displacement. Gas free fluids and solids flows into the second plurality of tubes and enters the next chamber.

Marshall Loop Chamber—Reversed Flow Regime.

In another example flow can be reversed through the Marshall Loop Chamber creating a "sump affect" within the chamber. In a Reversed Flow Regime, fluid enters through the Lower Tubes, with Gas free fluid flowing downward and entering Upper Tubes. Upper Tubes remain "sumped" in fluid, while free/broken gas bubbles accumulate above Lower Tubes. As with other configurations, accumulated gas expresses or exits the apparatus through a Gas Port located above the Lower Tubes.

How the Marshall Loop works—One Example.

A. Entry Tubes of Marshall Loop Chamber

As Gaseous and solids-laden fluid travels through Free Gas Chamber, Gaseous and/or solids-laden fluid then enters Entry Tubes of Marshall Loop Chamber. As Gaseous and/or solids-laden fluid travel through Entry Tubes of Marshall Loop Chamber, velocity increases and pressure decreases, precipitating entrained gas to break and form free gas bubbles. Gaseous and/or solids-laden fluid are further subjected to centrifugal effect, causing one or all of the following to occur, to wit; (1) entrained gas to break and form free gas bubbles, (2) bond between Solids and Gas broken resulting in Gas free solids and (3) coalescence of free/broken gas bubbles thereby creating larger and faster rising gas bubbles.

B. Marshall Loop Chamber

Free/broken Gas bubbles and Gaseous and/or solids-laden fluid exits Entry Tubes of Marshall Loop Chamber into the Marshall Loop Chamber. Velocity decreases and Free/broken Gas bubbles and Gaseous and/or solids-laden fluid are forced to reverse direction and travel to top of Marshall Loop Chamber.

C. Gas Pocket

Free/broken Gas bubbles accumulates and forms a gas pocket in portion of Marshall Loop Chamber above Exit Tubes.

D. Gas Port

A Gas Port may be provided, in one example, above Exit Tubes. Fluid exiting Entry Tubes forces, by virtue of displacement, accumulated free/broken gas to express or exit Apparatus through Gas Port located in top of chamber.

E. Exit Tubes-Marshall Loop Chamber

Gas Free Fluid and Gaseous and/or solids-laden fluid enters Exit Tubes of Marshall Loop Chamber and travels into the next Chamber.

F. Reversed Flow Regime-Marshall Loop Chamber

In another example, flow is reversed through the Marshall Loop Chamber creating a "sump affect" within the chamber. In a Reversed Flow Regime, fluid enters through the Lower Tubes, with Gas free fluid flowing downward and entering Upper Tubes. Upper Tubes remain "sumped" in fluid, while free/broken gas bubbles accumulate above Lower Tubes. As with other configurations, accumulated gas expresses or exits the apparatus through a Gas Port located above the Lower Tubes.

Huddle Chambers (See FIG. 7 (D-106), 7/11).

In one example. a plurality of tubes is provided by which gaseous and solids-laden fluids enter chamber; the first plurality of tubes opposing a second plurality of tubes, whereby fluid does not change direction of flow; free gas rises to the top of the chamber and gas free fluids and solids flows into the second plurality of tubes and enters the next chamber. Free gas is expelled from chamber through an orifice in the top of the chamber by way of displacement How the Huddle Works—One Example.

A. Entry Tubes of Huddle Chamber—Gas Free Fluid and Gaseous and/or solids-laden fluid enters the Entry Tubes of a Huddle Chamber, velocity increases and pressure decreases, precipitating entrained gas to break and form free gas bubbles. Gaseous and/or solids-laden fluid are further subjected to centrifugal effect, causing one or all of the following to occur, to wit; (1) entrained gas to break and form free gas bubbles, (2) bond between Solids and Gas broken resulting in Gas free solids and (3) coalescence of free/broken gas bubbles thereby creating larger and faster rising gas bubbles.

B. Huddle Chamber

Free/broken Gas bubbles, Gas Free Fluid and Gaseous and/or solids-laden fluid exits Entry Tubes of Huddle Chamber into the Huddle Chamber. Velocity decreases and Free/broken Gas bubbles rise to top of the Huddle Chamber and Accumulate in the Huddle Area. Gas Free Fluid and Gaseous and/or solids-laden fluid enter Exit Tubes of Huddle Chamber.

C. Huddle Area

Length of Entry Tubes creates a gas huddle area wherein Free/broken gas bubbles rise out of fluids and accumulate into the top of the Huddle Chamber.

D. Gas Port

A Gas Port, in one example, is provided in upper portion of Huddle Chamber. Fluid exiting Entry Tubes forces, by virtue of displacement, accumulated free/broken gas to express or exit Apparatus through Gas Port.

E. Exit Tubes of Huddle Chamber

Gas Free Fluid and Gaseous and/or solids-laden fluid enters Exit Tubes of Huddle Chamber and travels into the next Chamber.

F. Gas Free Fluid and Gaseous and/or solids-laden fluid enters Exit Tubes of Huddle Chamber and travels into the next Chamber or exits apparatus through Dip Tube, depending upon location of Chamber within the configuration of apparatus.

Clean Fluid Loading Chamber (See FIG. 8 (D-107), 8/11).

How the Loading Chamber Works—One Example.

A. Entry Tubes

Gas Free Fluid and/or solids-laden fluid enters Entry Tubes of Loading Chamber. Gas Free Fluid and/or solids-laden fluid are further subjected to centrifugal effect, causing one or all of the following to occur, to wit; (1) entrained gas to break and form free gas bubbles, (2) bond between Solids and Gas broken resulting in Gas free solids and (3) coalescence of free/broken gas bubbles thereby creating larger and faster rising gas bubbles.

B. Loading Chamber

Free/broken Gas bubbles, Gas Free Fluid and Gaseous and/or solids-laden fluid exits Entry Tubes of Clean Fluid Loading Chamber into the Loading Chamber.

Velocity decreases and Free/broken Gas bubbles rise to top of the Loading Chamber and Accumulate in the Huddle Area. Solids drop out of fluid into Solids Chamber.

C. Gas Port

A Gas Port, in one example, is provided in upper portion of Clean Fluid Loading Chamber. Fluid exiting Entry Tubes forces, by virtue of displacement, accumulated free/broken gas to express or exit Apparatus through Gas Port.

Dip Tube or Inner Tube.

Gas Free Fluid and Solids Free Fluid from the Loading Chamber enters Dip Tube (the inner pipe) and travels through Dip Tube to a point at which Gas Free Fluid and Solids Free Fluid exits Apparatus.

Reversed Flow Chambers (See FIG. 10 (D-109), 10/11).

In another example, fluid from loading chamber flows though Dip Tube past isolation above intake and enters one or more additional Reverse Flow Chambers (see FIG. 10 (D-109), 10/11).

Fluid exits Dip Tube through Orifice located in the upper portion of the Bottom Reverse Flow Chamber. Any remaining gas rises above the orifice into the top of the Bottom Reverse Flow Chamber and Gas Free liquid flows to the lower portion of the Bottom Reverse Flow chamber and enters the first open ends of a plurality of tubes. Fluid flows from the lower portion of the Bottom Reverse Flow chamber through a plurality of tubes into the upper portion of the Top Reverse Flow chamber. Any remaining gas rises above the second open ends of a plurality of tubes into the upper portion of the Top Reverse Flow Chamber and Gas Free liquid flows to the lower portion of the Top Reverse Flow chamber and enters an Orifice in the Dip Tube in the lower portion of the Top Reverse Flow Chamber. Fluid flows from the lower portion of the Top Reverse Flow chamber through the Dip tube and exits apparatus.

In another example, Two chambers positioned and arranged above the Intake chamber, a plurality of tubes whereby fluid communicates between the two chambers; first an orifice in the top of the Bottom Reverse Flow chamber positioned and arranged to expel gases; an orifice into the inner tube, positioned and arranged in the top of the Bottom Reverse Flow chamber; and where the first open ends of the plurality of tubes is positioned and arranged in the bottom of the Bottom Reverse Flow chamber and below the orifice into the Bottom Reverse Flow chamber inner tube; and where the Bottom Reverse Flow chamber orifice for expelling gases is positioned and arranged above both the first open ends of the plurality of tubes and an orifice into the Bottom Reverse Flow chamber inner tube.

The Top Reverse Flow chamber positioned and arranged above the Bottom Reverse Flow chamber; where the second open ends of the plurality of tubes are positioned and arranged in the upper portion of the Top Reverse Flow chamber; an orifice in the Top Reverse Flow chamber positioned and arranged to expel gases; an orifice into an inner tube, positioned and arranged in the lower portion of the Top Reverse Flow chamber; and where the second open ends of the plurality of tubes is positioned and arranged above the orifice into the Top Reverse Flow chamber inner tube; and where an orifice into the Top Reverse Flow chamber inner tube is positioned and arranged below the second open ends of the plurality of tubes; and where the Top Reverse Flow chamber orifice for expelling gases is positioned and arranged above both the second open ends of the plurality of tubes and an orifice into the Top Reverse Flow chamber inner tube.

EXAMPLES

One example of the apparatus for gas and solids separation from down-hole fluids is described as follows:

an inner tube having a length in a longitudinal direction;

an outer tube disposed about the inner tube;

a plurality of chambers, wherein each chamber is defined by an annular region between the outer tube, the inner tube, and a first fluid barrier and a second fluid barrier, each fluid barrier disposed in an annular region between the inner tube and the outer tube;

wherein one of the plurality of chambers comprises an intake chamber, in fluid communication with the outside of the outer tube through an orifice;

wherein one of the plurality of chambers comprises a first processing chamber (ML) disposed longitudinally adjacent to the intake chamber;

wherein one of the plurality of chambers comprises a second processing chamber (H) disposed longitudinally adjacent to the first processing chamber, opposite from the intake chamber;

wherein one of the plurality of chambers comprises a third processing chamber (CL) disposed longitudinally adjacent to the second processing chamber (H), opposite from the first processing chamber (ML);

wherein one of the plurality of chambers comprises a fourth processing chamber (R1) disposed longitudinally adjacent to the intake chamber, opposite from the first processing chamber (ML);

wherein one of the plurality of chambers comprises a fifth processing chamber (R2) disposed longitudinally adjacent to the fourth processing chamber (R1), opposite from the intake chamber;

wherein fluid communication between the intake chamber and the first processing chamber (ML) is restricted to fluid flow through a first set of a plurality of tubes;

wherein fluid communication between the first processing chamber (ML) and the second processing chamber (H) is restricted to fluid flow through a second set of a plurality of tubes;

wherein fluid communication between the second processing chamber (H) and the third processing chamber (CL) is restricted to fluid flow through a third set of a plurality of tubes;

wherein a block restricts fluid communication within the inner tube between the fourth processing chamber (R1) and the fifth processing chamber (R2);

wherein fluid communication between the third processing chamber (CL) and the fourth processing chamber (R1) is restricted to fluid flow through the inner tube;

wherein an orifice in the inner tube is disposed in the fourth processing chamber (R1), proximate to the fifth processing chamber (R2) and on a first side of the block, providing fluid communication between fourth processing chamber (R1) and the inner tube;

wherein an orifice in the inner tube is disposed in the fifth processing chamber (R2), proximate to the fourth processing chamber (R1) and on the opposite side of the block, providing fluid communication between fifth processing chamber (R2) and the inner tube; and wherein fluid communication between the fourth processing chamber (R1) and the fifth processing chamber (R2) is restricted to fluid flow through a fourth set of a plurality of tubes.

In a further example, a second orifice is disposed on the outer tube of the first processing chamber, proximate to the intake chamber. In a further example, a second orifice disposed on the outer tube placing the first processing chamber in fluid communication with the exterior surface of the outer tube. In a further example, the first processing chamber (ML) is in fluid communication with the outside of the outer tube through an orifice. In a further example, the second processing chamber (H) is in fluid communication with the outside of the outer tube through an orifice. In a further example, the third processing chamber (CL) is in fluid communication with the outside of the outer tube through an orifice. In a further example, the fourth processing chamber (R1) is in fluid communication with the outside of the outer tube through an orifice. In a further example, the fifth processing chamber (R2) is in fluid communication with the outside of the outer tube through an orifice.

INDUSTRIAL APPLICABILITY

The method(s), apparatus, and system(s) disclosed herein have direct industrial applicability in the oil & gas extraction industry.

In summary, herein disclosed are particular structural means for forcing the de-gassing of the gaseous liquid, including means for changing the velocity of the gaseous liquid (speed changes on each exit from the tubes owing to the volume difference between the tubes and the chamber), means for changing the direction of the gaseous liquid (owing to the flow changing direction from exiting one set of tubes to travel to the opening to enter the next set of tubes), and means for changing the pressure of the gaseous liquid (owing perhaps in part to evolution of gas upon entering increased volume).

These and other objectives, features, and advantages of the present invention will become apparent from the following detailed drawings and associated description that accompanying the drawings.

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

The invention claimed is:

1. An apparatus for gas and solids separation from downhole fluids comprising:
    an inner tube, thereby forming a production tube;
    an outer tube disposed about the inner tube, thereby forming an annular region between the tubes;
    a plurality of chambers contained within the annular region;
    fluid barriers separating the chambers;
    wherein the plurality of chambers comprises:
        an intake chamber to receive fluids from outside of the outer tube, further comprising an orifice disposed on the outer tube; and
        a plurality of processing chambers;
    wherein fluid communication between the intake and processing chambers is restricted to fluid flow through sets of tubes;
    wherein fluid communication between a lowermost processing chamber below the intake chamber and a lower processing chamber above the intake chamber is restricted to fluid flow through the inner tube;
    wherein a block restricts fluid communication within the inner tube to other chambers above the intake chamber; and
    wherein orifices in the inner tube of the processing chambers on either side of the block provide fluid communication across the block through a set of tubes between the two processing chambers.

2. The apparatus of claim 1 wherein the tubes of the sets of tubes comprise polytetrafluoroethylene (PTFE).

* * * * *